(12) United States Patent
Timbes

(10) Patent No.: US 7,089,700 B2
(45) Date of Patent: Aug. 15, 2006

(54) SHOCK SUPPRESSION SYSTEM FOR A FISHING ROD

(76) Inventor: David Craig Timbes, 11800 Oscoda Ct., Bokeelia, FL (US) 33922

( * ) Notice: Subject to any disclaimer, the term of this patent is extended or adjusted under 35 U.S.C. 154(b) by 0 days.

(21) Appl. No.: 11/065,314

(22) Filed: Feb. 24, 2005

(65) Prior Publication Data

US 2005/0188604 A1 Sep. 1, 2005

Related U.S. Application Data

(60) Provisional application No. 60/548,036, filed on Feb. 26, 2004.

(51) Int. Cl.
*A01K 87/00* (2006.01)
*A01K 91/06* (2006.01)
*A01K 91/10* (2006.01)

(52) U.S. Cl. .................. 43/19.2; 43/20; 43/25

(58) Field of Classification Search .............. 43/19.2, 43/42.72, 25, 20, 19, 4; 482/112; 16/66; A01K 87/00, A01K 91/06, 91/10
See application file for complete search history.

(56) References Cited

U.S. PATENT DOCUMENTS

| | | | |
|---|---|---|---|
| 0,154,141 A | 8/1874 | Hill | |
| 2,731,758 A * | 1/1956 | Coe | 43/42.72 |
| 2,851,811 A | 9/1958 | Mantell | |
| 2,942,372 A | 6/1960 | Wier | |
| 3,217,442 A * | 11/1965 | Nygren | 43/19 |
| 3,344,547 A * | 10/1967 | Schroeder et al. | 43/19 |
| 3,419,991 A * | 1/1969 | Mitchell | 43/19 |
| 3,529,375 A * | 9/1970 | Dey | 43/17 |
| 3,660,922 A * | 5/1972 | Chill | 43/15 |
| 3,754,346 A * | 8/1973 | Worsham | 43/19 |
| 3,766,680 A | 10/1973 | Torme et al. | |
| 3,828,459 A * | 8/1974 | Easom | 43/19 |
| 4,660,317 A * | 4/1987 | Evans | 43/19.2 |
| 4,794,722 A * | 1/1989 | Crevoisier | 43/42.72 |
| 4,843,755 A * | 7/1989 | Lin | 43/42.72 |
| 5,048,219 A * | 9/1991 | Georgescu | 43/4 |
| 5,505,679 A * | 4/1996 | McBride et al. | 482/53 |
| 5,735,074 A * | 4/1998 | Stauffer | 43/19 |
| 5,809,684 A * | 9/1998 | Carter et al. | 43/16 |
| 5,934,005 A | 8/1999 | Utsuno et al. | |
| 5,937,565 A | 8/1999 | Maric et al. | |
| 6,125,573 A * | 10/2000 | Wilczynski | 43/25 |
| 6,347,478 B1 * | 2/2002 | Stephens et al. | 43/43.1 |
| 6,493,981 B1 | 12/2002 | Izzard | |
| 6,612,264 B1 * | 9/2003 | Levine | 119/795 |
| 2005/0241213 A1 * | 11/2005 | Garber | 43/21.2 |

* cited by examiner

*Primary Examiner*—Darren W. Ark
*Assistant Examiner*—John Holman
(74) *Attorney, Agent, or Firm*—Robert L. Wolter, Esquire; Beusse Wolter Sanks Mora & Maire, P.A.

(57) ABSTRACT

A shock suppression system for a fishing rod is mounted to a fishing rod and connected to the secure end of the fishing line for dampening the movement of the secure end of the toward the tip of the rod when a force is applied to the free end of the line by a fish hooked on the line. The invention may include a piston attached to a cartridge that is mounted to the handle portion of the fishing rod. The piston is attached in sliding engagement to the cartridge, which has a mechanism for dampening the movement of the piston toward the rod tip. Such a mechanism may be found in pneumatic cylinders, hydraulic cylinders or compression spring systems as found on a screen door for a home.

14 Claims, 3 Drawing Sheets

SHOCK SUPPRESSION SYSTEM FOR A FISHING ROD

Applicant herein claims priority to the Provisional Patent Application, U.S. Ser. No. 60/548,036 filed Feb. 26, 2004.

FIELD OF THE INVENTION

This invention relates in general to fishing rods. More specifically, the invention pertains to systems used for controlling or influencing the movement of a fishing line on a fishing rod when a fishermen attempts to land a fish on the line.

BACKGROUND OF THE INVENTION

Some methods of fishing include affixing a fishing line to a portion of the fishing rod. For example, "snook" poles have fishing line secured to a handle portion of the fishing rod. Such fishing rods are typically used when fishing for large game fish, such as snook, tarpon or grouper under or around piers or fishing underwater structures from a boat. A limited amount of line is necessary to prevent the fish from running under the piers or underwater water structures and breaking the line. When a fish takes bait attached to a hook on an end of the fishing line a fisherman, feeling the pull from the fish will set the hook in the fishes mouth by forcefully pulling the rod upward.

Typically a fish will attempt to run when the hook is set, or when a fisherman attempts to set a hook; however, such fishing rods have only a limited amount of line, so very little slack is available for the fish to run. Consequently, the fisherman expends a great deal of effort in fighting and landing the fish. In addition, the force applied by the fish on the line, in combination with the force applied on the rod by the fisherman pulling on the rod often causes the line to break. As the line has very little slack, the sudden shock to the line causes it to break. Forty pound to one hundred pound test line has been used on standard "snook" poles and broken easily. Accordingly, a need exists for a system to suppress the shock applied to the line when the fish takes the line and/or fishermen attempt to set the hook.

SUMMARY OF THE INVENTION

The present invention is for a fishing rod and line having a shock suppression system that comprises a rod having a handle portion, a rod portion and a tip on the rod portion distal the handle portion. The fishing rod also includes a line having a secure end and a free end, wherein at least one hook is attached to the free end of the line. At least one eyelet is mounted on the rod portion through which the free end of the line is passed. The secure end of the line is connected to the rod so to that the secure end of the line is capable of moving toward the rod tip when force is applied to the line, or the rod, when a fish is hooked.

A means is mounted to the handle portion of the fishing rod and connected to the secure end of the line for dampening the movement of the secure end of the toward the tip of the rod when a force is applied to the free end of the line by a fish hooked on the line. An embodiment of the invention may include a piston attached to a cartridge that is mounted to the handle portion of the fishing rod. The piston is attached in sliding engagement to the cartridge, which has a mechanism for dampening the movement of the piston toward the rod tip. Such a mechanism may be found in pneumatic cylinders, hydraulic cylinders or compression spring systems as found on a screen door for a home.

When a fish bites bait on the free end of the line and/or a fisherman pulls on the fishing rod to set a hook or land a fish and enough force is applied to the line or rod, the piston and/or secure end of the line can move toward the tip of the rod. The movement of the line provides some slack in the line, and the dampener in the cartridge resists the movement of the line thereby suppressing the initial shock applied to the rod when a fish takes the bait. In addition, the present system allows the fisherman to apply additional force to the rod and line to land a fish without breaking the line. The present invention is not as cumbersome, and less expensive than rod and reel assemblies necessary to manage one hundred pound test line, makes landing a large game fish more manageable and enjoyable.

BRIEF DESCRIPTION OF THE DRAWINGS

The features and advantage of the present invention will become apparent from the following detailed description of the invention when read with the accompanying drawings.

DETAILED DESCRIPTION OF THE DRAWINGS

Figure 1:
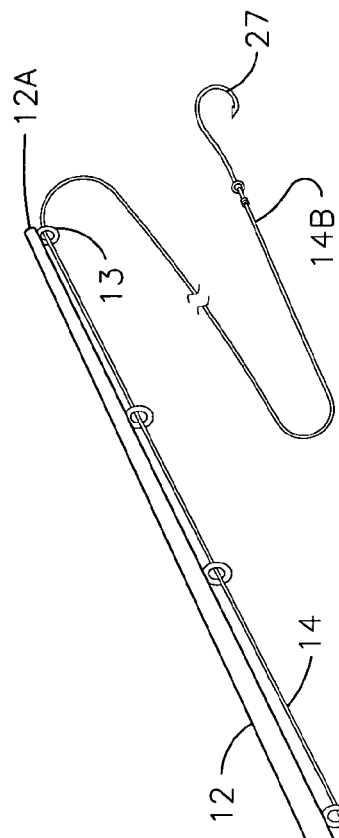
FIG. 1 is a perspective view of an embodiment of the invention.
Figure 2:
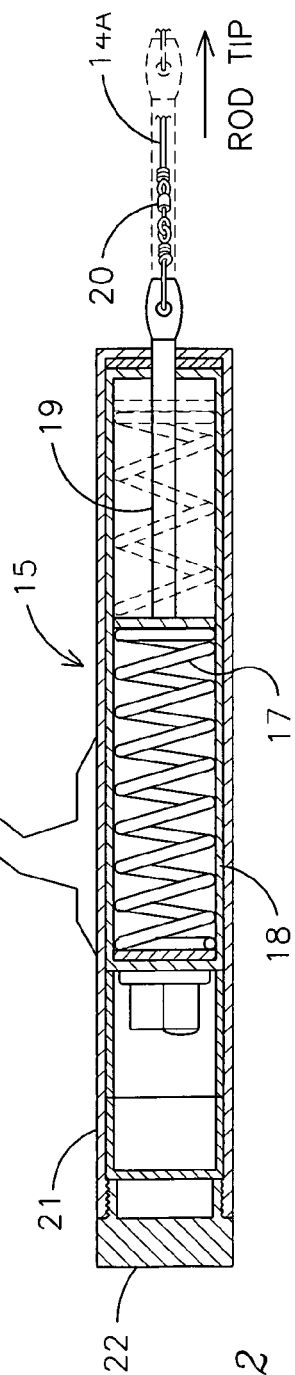
FIG. 2 is a sectional view of an embodiment of the invention.
Figure 3:
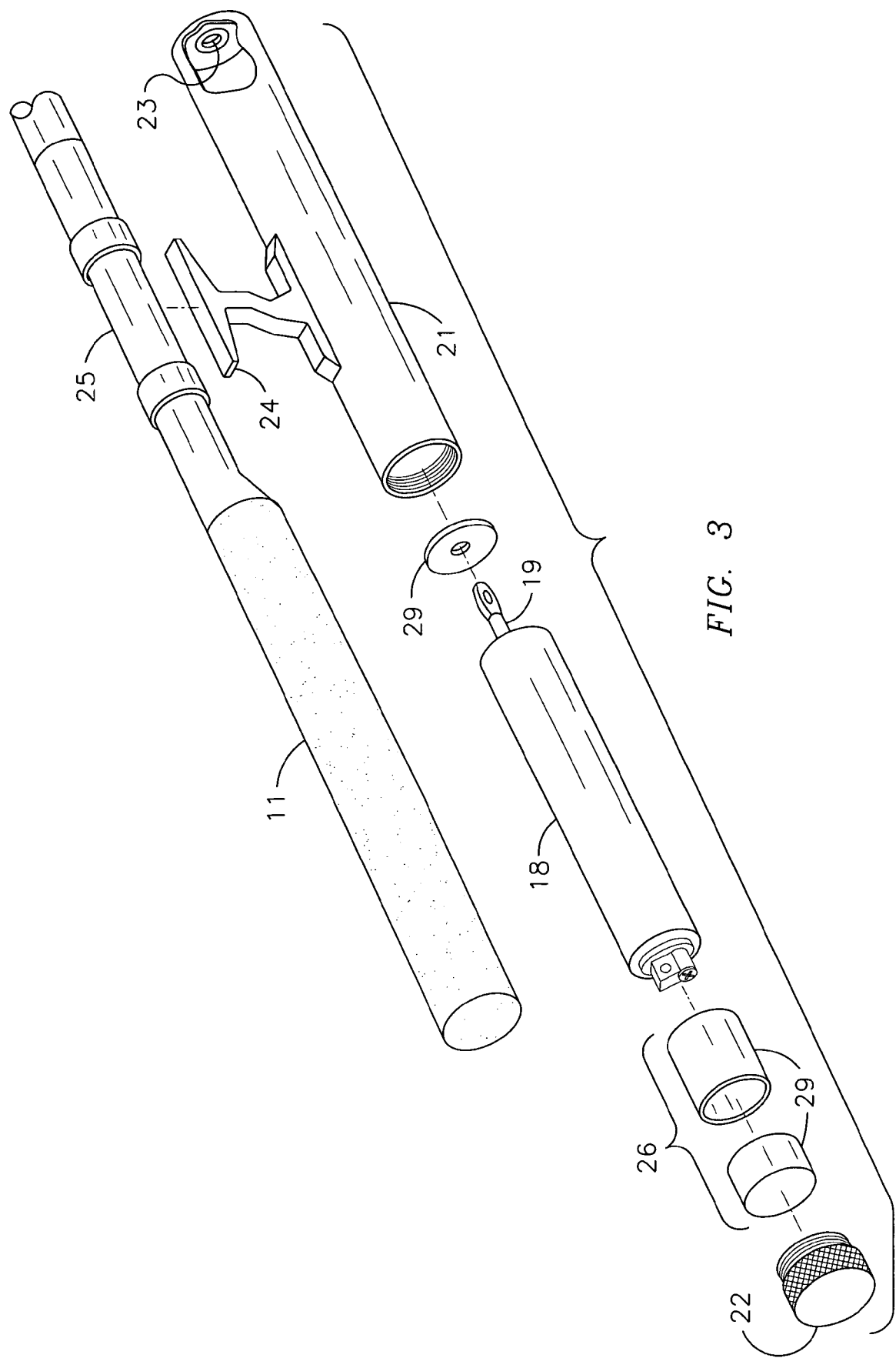
FIG. 3 is an exploded view of an embodiment of the invention.

An embodiment of the invention for a shock suppression system for a fishing rod is depicted in FIGS. 1, 2 and 3. The fishing rod 10, shown in FIG. 1, includes a handle portion 11 and a rod portion 12. The rod portion 12 includes a tip 12A that is distal to the handle portion 11. At least one eyelet 13, through which a fishing line 14 passes, is mounted on the rod 12 preferably on or near the rod tip 12A. The line 14 includes a secure end 14A that is connected to the handle portion 11 as described in more detail below, and a free end 14B that is passed through the eyelet 13, and to which a hook 27 is attached. The secure end 14A of the line 14 is connected to the rod 10 in such a manner that the secure end 14A is capable of moving toward the rod tip 14A when a fish takes the bait on the hook 27, and/or when a fisherman is pulling on the rod 10 in order to set the hook 27 in the fish or otherwise trying to land the fish.

In an exemplary embodiment, the shock suppression system 15 is mounted to the handle portion 11 of the fishing rod 10, and is designed to influence or resist the movement of the line 14 toward the rod tip 12A. As explained in more detail below, the shock suppression system applies a predetermined amount of resistance to the movement of the fishing line 14 when a fish takes bait on the hook 27, the fish begins a run and/or when a fisherman pulls on the rod in order to set the hook 27 in the fish or otherwise trying to land the fish.

An example of a shock suppression system 15 is shown in FIG. 2 and comprises a piston 19 connected at one end to a compression spring 17 and to the fishing line 14 at its other end. The secure end 14A of the line 14 is connected to the piston 19 by a swivel connector 20. The compression spring 17 is operatively mounted within a cartridge 18 in such a manner that the spring dampens the movement of piston 19 when a force is applied to the free end 14B of the line 14.

With respect to FIG. 2, piston 19 and compression spring 17 are shown in a retracted position, which is the normal position of the piston 19 and line 14 before a force is applied to either the rod 10 or line 14. When such a force is applied to the rod 10 or line 14, piston 19 and line 14 are pulled to an extended position, with the piston 19 having moved toward the rod tip 12A, as illustrated by the dotted lines.

Figure 4:
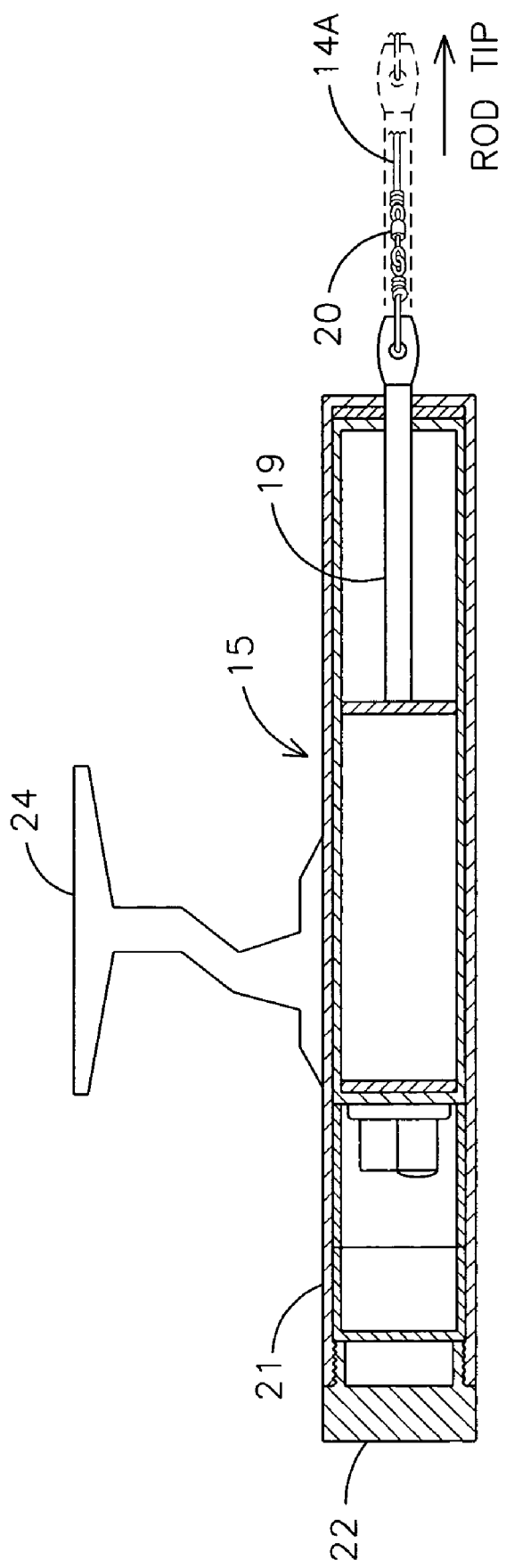
FIG. 4 is a sectional view of an embodiment of the invention having a pneumatic cylinder.

Similar compression spring systems may be used on screen doors for homes that offer the necessary amount of resistance for operation of the present invention. For example, spring door closers, VJ1020 manufactured by Wright Products, Inc. located in Rice Lake, Wis., and require about twenty-eight pounds to thirty pounds of pressure to actuate the piston 19, may be used. However, the shock suppression system is not intended to be so limited. Indeed, hydraulic or pneumatically operated cylinders (shown in FIG. 4) require similar ranges of pressure to actuate the piston may be used.

The shock suppression system 15 is illustrated in FIG. 3, depicts a mounting system that enables a fisherman to both mount and replace the shock suppression system 15 to the fishing rod. The mounting system includes a housing 21, in which the cartridge 18 is placed. The housing 21 includes a detachable back end 22 for insertion of the cartridge 18. The front end of the housing 21 has an aperture 23 through which the piston 19 extends and is allowed to move. A foot 24 fixed to the housing 21 fits within a reel mount 25 on the handle portion 11 of the fishing rod 10. The housing mounting system, including the housing 21 and foot 24, is preferably constructed from a durable non-corrosive material such as aluminum, stainless steel and/or plastic.

A spacer assembly 26 may also be positioned in the housing 21 to support the cartridge 18 within the casing 21. Further, or alternatively, spacers 29 may be positioned along the body of the cartridge 18 between the cartridge and inside surface of the housing 21. For example, electrical tape or o-rings attached to the body of the cartridge may adequately provide support for the cartridge 18. In addition, seals 29 or o-rings can be positioned between the aperture 23 and cartridge 18, or on the back end 22 of the housing 21 to seal the housing 21.

When the system 15 requires maintenance or repair, the backend 22 of the housing 21 is removed and a new cartridge 18 is inserted into the housing 21 and the fishing line 14 is connected to the piston 19. The back end 22 may include a threaded cap as shown in FIG. 2, but is not limited to such an embodiment. Any type of closure that can be removed and provides adequate seal is acceptable.

In operation, when a fish takes bait attached to the fishing line 14 and hook 27, and the fish tries to escape, and/or when a fisherman applies force to the rod 10 or line 14 to hook or land the fish, the piston 19 and line 14 will move or give toward the rod tip 12A. The compression spring 17 applies a resistance force to the line 14 dampening movement of the piston 19 or line 14; thereby suppressing the shock to the line 14 and rod 10 that may normally occur if the fishing line 14 is fixed to the rod 12. In addition, the resistance applied by the spring 17 will tire the fish, enabling the fisherman to land fish with less effort by the fisherman.

The suppression system can be adapted to be used on any size pole for any type of fish; however, it is particularly useful in landing larger saltwater game fish such as tarpon, snook or grouper when fishing from piers, bridges or fishing underwater structures from a boat.

While the invention has been described in what is presently considered to be a preferred embodiment, many variations and modifications will become apparent to those skilled in the art. Accordingly, it is intended that the invention not be limited to the specific illustrative embodiment, but be interpreted within the full spirit and scope of the appended claims.

What I claim as my invention is:

1. In a fishing rod having a handle portion, a rod portion, and a tip on the rod portion distal the handle portion and a line having a secure end and a free end that is inserted through at least one eyelet mounted on the rod portion, the improvement comprising a shock suppression system comprising:
   a cartridge mountable to the handle portion of the fishing rod and having a longitudinal axis substantially parallel to a longitudinal axis of the fishing rod when mounted thereto;
   a piston having a first end positioned within the cartridge and a second end connectable to the secure end of the fishing line wherein the piston is in a retracted position with respect to the cartridge before a force is applied to the line or the rod, and the piston is attached in sliding engagement with the cartridge for movement parallel to the longitudinal axis of the cartridge toward the rod tip when a force is applied to the free end of the line or to the rod; and,
   means, positioned within the cartridge and connected to the first end of the piston, for dampening the movement of the piston toward the tip of the rod.

2. The system of claim 1 further comprising a housing mounted to the handle portion of the fishing rod within which the cartridge is attached and the housing having an aperture in a front end of the housing through which the piston extends.

3. The system of claim 2 wherein the housing has an opening in a second end of the housing through which the cartridge is inserted and a cap to close the opening.

4. The system of claim 3 wherein a spacer is positioned within the housing at a back end of the housing abutting the cartridge and the cap to support the cartridge within.

5. The system of claim 3 further comprising one or more seals on the cap or adjacent the aperture and piston to seal an interior of the housing.

6. The system of claim 2 a spacer is mounted between the cartridge body and inside surface of the housing to support the cartridge in the housing.

7. The system of claim 1 further comprising a swivel link attached to the second end of the piston and the secure end of the fishing line.

8. A fishing rod and line, comprising:
   a rod having a handle portion, a rod portion and a tip on the rod portion distal the handle portion;
   a line having a secure end and a free end, and the free end having at least one hook attached thereon;
   at least one eyelet mounted on the rod portion through which the free end of the line is passed;
   means, mounted to the handle portion and connected to the secure end of the line, for dampening the movement of the secure end of the toward the tip of the rod when a force is applied to the free end of the line by a fish hooked on the line; and
   wherein the dampening means comprises a cartridge within which a compression spring is mounted and a piston having a first end that is connected to the compression spring, and the secure end of the line is connected to the piston which is movable along a longitudinal axis substantially parallel to a longitudinal axis of the fishing rod toward the rod tip when a force is applied to the line when a fish takes a bait on the hook or a fisherman applies a force to the rod, and the piston is in a retracted piston before a force is applied to the line or rod, and moves toward the rod tip when a force is applied to the line or rod.

9. A fishing rod and line comprising:
a rod having a handle portion, a rod portion and a tip on the rod portion distal the handle portion;
a line having a secure end and a free end, and the free end having at least one hook attached thereon;
at least one eyelet mounted on the rod portion through which the free end of the line is passed;
means, mounted to the handle portion and connected to the secure end of the line, for dampening the movement of the secure end of the toward the tip of the rod when a force is applied to the free end of the line by a fish hooked on the line; and
wherein the dampening means comprises a pneumatic cylinder having a cartridge and a piston that is attached to the cartridge and the secure end of the line is connected to the piston, which is movable along a longitudinal axis substantially parallel to a longitudinal axis of the fishing rod toward the rod tip when a force is applied to the line when a fish takes a bait on the hook or a fisherman applies a force to the rod, and the piston is in a retracted position before a force is applied to the line or rod, and moves toward the rod tip when a force is applied to the line or rod.

10. A fishing rod and line, comprising:
a rod having a handle portion, a rod portion and a tip on the rod portion distal to the handle portion;
a line having a secure end and a free end, and the free end having at least one hook attached thereon;
at least one eyelet mounted on the rod portion through which the free end of the line is inserted;
a cartridge mounted to the handle portion of the fishing rod and having a longitudinal axis substantially parallel to a longitudinal axis of the fishing rod;
a piston having a first end positioned within the cartridge and a second end connected to the secure end of the fishing line wherein the piston is in a retracted position with respect to the cartridge before a force is applied to the line or rod, and the piston is attached in sliding engagement with the cartridge for movement substantially parallel to the longitudinal axis of the cartridge toward the rod tip when a force is applied to the free end of the line or to the rod; and,
means, positioned within the cartridge and connected to the first end of the piston, for dampening the movement of the piston toward the tip of the rod.

11. The fishing rod and line of claim 10 further comprising a housing mounted to the handle portion of the fishing rod within which the cartridge is attached and the housing having an aperture in a front end of the housing through which the piston extends.

12. The fishing rod and line of claim 11 wherein the housing has an opening in a second end of the housing through which the cartridge is inserted and a cap to close the opening.

13. The fishing rod and line of claim 12 wherein a spacer is positioned within the housing at the back end of the housing abutting the cartridge and the cap to support the cartridge within.

14. The fishing rod and line of claim 10 further comprising a swivel link attached to the second end of the piston and the secure end of the fishing line.

* * * * *